(12) United States Patent
Kunt et al.

(10) Patent No.: US 11,132,215 B2
(45) Date of Patent: Sep. 28, 2021

(54) TECHNIQUES TO FACILITATE OUT OF BAND MANAGEMENT IN A VIRTUALIZATION ENVIRONMENT

(71) Applicant: Intel Corporation, Santa Clara, CA (US)

(72) Inventors: Maksymilian Kunt, Gdansk (PL); Piotr Wysocki, Gdansk (PL); Slawomir Ptak, Gdansk (PL); Kapil Karkra, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 274 days.

(21) Appl. No.: 16/454,703

(22) Filed: Jun. 27, 2019

(65) Prior Publication Data
US 2019/0317796 A1  Oct. 17, 2019

(51) Int. Cl.
*G06F 3/06* (2006.01)
*G06F 9/455* (2018.01)
*G06F 13/42* (2006.01)
*H04L 29/08* (2006.01)

(52) U.S. Cl.
CPC ........ *G06F 9/45558* (2013.01); *G06F 3/0604* (2013.01); *G06F 3/0635* (2013.01); *G06F 3/0689* (2013.01); *G06F 13/4221* (2013.01); *G06F 2213/0026* (2013.01); *H04L 67/10* (2013.01)

(58) Field of Classification Search
None
See application file for complete search history.

(56) References Cited

U.S. PATENT DOCUMENTS

2014/0281070 A1* 9/2014 Natu ................. G06F 12/06
710/105

* cited by examiner

*Primary Examiner* — Scott C Sun
(74) *Attorney, Agent, or Firm* — Compass IP Law PC

(57) ABSTRACT

Techniques to facilitate an out-of-band (OOB) management in a virtualization environment include examples of assigning an endpoint identifier to a domain mapped to physical memory addresses of one or more storage devices coupled with a computing platform. The domain may enable software or a device driver executed by a virtual machine (VM) to access, manage or control at least a portion of the one or more storage devices. Examples also include receiving or forwarding messages through an OOB communication link coupled with the computing platform to a management entity to facilitate OOB management of the software or the device driver executed by the VM.

20 Claims, 13 Drawing Sheets

1000

RECEIVE, AT A MANAGEMENT CONTROLLER FOR A COMPUTING PLATFORM, DOMAIN INFORMATION FOR A DOMAIN FOR USE BY SOFTWARE OR A DEVICE DRIVER EXECUTED BY A VM, THE DOMAIN INFORMATION INDICATING THAT THE DOMAIN IS MAPPED TO PHYSICAL MEMORY ADDRESSES OF ONE OR MORE STORAGE DEVICES COUPLED WITH THE COMPUTING PLATFORM VIA WHICH THE SOFTWARE OR THE DEVICE DRIVER IS ABLE TO DIRECTLY ACCESS, MANAGE OR CONTROL AT LEAST A PORTION OF THE ONE OR MORE STORAGE DEVICES
*1002*

RECEIVE A REQUEST MESSAGE FROM A MANAGEMENT ENTITY FOR A DATA CENTER THAT INCLUDES THE COMPUTING PLATFORM, THE REQUEST MESSAGE RECEIVED VIA AN OOB COMMUNICATION LINK AND INCLUDING INFORMATION DIRECTED TO THE SOFTWARE OR THE DEVICE DRIVER
*1004*

FORWARD THE REQUEST MESSAGE IN ONE OR MORE MCTP PACKETS THAT INDICATE THE ASSIGNED MCTP EID IS A DESTINATION MCTP ENDPOINT FOR THE REQUEST MESSAGE
*1006*

FIG. 10

Storage Medium 1100

*Computer Executable Instructions for 1000*

1302
RECEIVE ASSIGNMENT INFORMATION FOR ASSIGNMENT OF A DOMAIN MAPPED TO PHYSICAL MEMORY ADDRESSES OF ONE OR MORE STORAGE DEVICES COUPLED WITH THE COMPUTING PLATFORM TO SOFTWARE OR A DEVICE DRIVER EXECUTED BY A VM TO ENABLE THE SOFTWARE OR THE DEVICE DRIVER TO DIRECTLY ACCESS, MANAGE OR CONTROL AT LEAST A PORTION OF THE ONE OR MORE STORAGE DEVICES

1304
SEND INFORMATION TO A MANAGEMENT CONTROLLER FOR THE COMPUTING PLATFORM TO INDICATE ASSIGNMENT OF THE DOMAIN TO THE SOFTWARE OR THE DEVICE DRIVER

1306
RECEIVE, FROM THE MANAGEMENT CONTROLLER, AN MCTP EID FOR THE DOMAIN THAT IS FOR USE BY THE SOFTWARE OR THE DEVICE DRIVER TO RESPOND TO REQUEST MESSAGES FROM A MANAGEMENT ENTITY FOR A DATA CENTER THAT INCLUDES THE COMPUTING PLATFORM, THE REQUEST MESSAGES INCLUDED IN MCTP PACKETS THAT INDICATE THE MCTP EID AS A DESTINATION MCTP EID FOR THE REQUEST MESSAGES

FIG. 13

Storage Medium 1400

*Computer Executable Instructions for 1300*

*FIG. 14*

TECHNIQUES TO FACILITATE OUT OF BAND MANAGEMENT IN A VIRTUALIZATION ENVIRONMENT

TECHNICAL FIELD

Descriptions are generally related to techniques to out of band (OOB) management of virtual machines (VMs) executing software and/or device drivers.

BACKGROUND

A virtualization environment for a server or computing platform deployed in a data center may include computing resources (e.g., processors, memory, network interfaces, etc.) of the server or computing platform arranged to support or host a plurality of virtual machines (VMs). Typically, a hypervisor or virtual machine monitor (VMM) may be a part of system software for the computing platform. The hypervisor or VMM may orchestrate creation, modification or migration of VMs within a given computing platform (e.g., between processors or cores) or to other computing platform(s) coupled with the given computing platform.

In an example virtualization case, storage software may be implemented or executed by one or more VMs supported by a computing platform. The storage software may include implementing redundant array of independent disks (RAID) as part of a data storage virtualization technology. Software RAID executed by these one or more VMs may be flexible and may have relatively fast configurability to meet user needs. In a virtualization environment that enables storage resources (e.g., solid state drives) to be allocated to a few or dozens of VMs, storage software such as software RAID may provide for several storage solution options for use in a data center.

BRIEF DESCRIPTION OF THE DRAWINGS

FIG. 10 illustrates an example first logic flow.
FIG. 11 illustrates an example first storage medium.
FIG. 13 illustrates an example second logic flow.
FIG. 14 illustrates an example second storage medium.

DETAILED DESCRIPTION

A data center may consist of a significant number of server or computing platforms having a specific amount of storage resources that may include solid state drives (SSDs), hard disk drives (HDD) or combinations of SSDs and HDD. Each server or computing platform may be communicatively coupled or connected to two main networks. The first being an external network that may be considered as unsafe or less secure and used (e.g., by clients) for a standard data flow. The second being an isolated internal network that may be considered as safe or more secure and used to manage servers or computing platforms of the data center. The second type of network may enable management of the servers or computing platforms via out-of-band (OOB) communication links. Storage software such as software RAID implemented in a virtualization environment by VM(s) hosted by servers or computing platforms of the data center may provide several storage solution options. An OOB management of storage software implemented or executed by these VMs through OOB communication links to manage a type of storage software such as software RAID may be desirable.

In some examples, OOB management may include, but is not limited to, collecting information about computing platform capabilities, triggering appropriate actions for storage software (e.g., RAID create, rebuild, flush cache, migrate data, etc.), monitoring storage drive health states, monitoring RAID state, or updating storage drive firmware. In some solutions OOB management may be routed through a type of OOB communication link such as one that is configured to operate according to the "Intelligent Platform Management Interface Specification", Second Generation, v2.0, Rev. 1.1. published in April of 2105 by Intel® Corporation (hereinafter "the IPMI specification"). An OOB communication link configured to operate according to the IPMI specification may enable indirect OOB management of storage software implemented by VMs of a computing platform through system software such as a hypervisor or VMM. The indirect OOB management may include use of a computing platform management controller such as a baseboard management controller (BMC) to route commands to storage software executed by a VM through the hypervisor or VMM. However, indirect OOB management may reduce flexibility in a virtualization environment that may have many VMs being managed by a single hypervisor or VMM. Also, routing all OOB management commands through a hypervisor or VMM may consume an undesirable amount of computing platform resources and/or may have unacceptable response latencies. Thus, a need exists for techniques to enable direct OOB management of storage software implemented or executed by VMs hosted by the computing platform.

Figure 1:
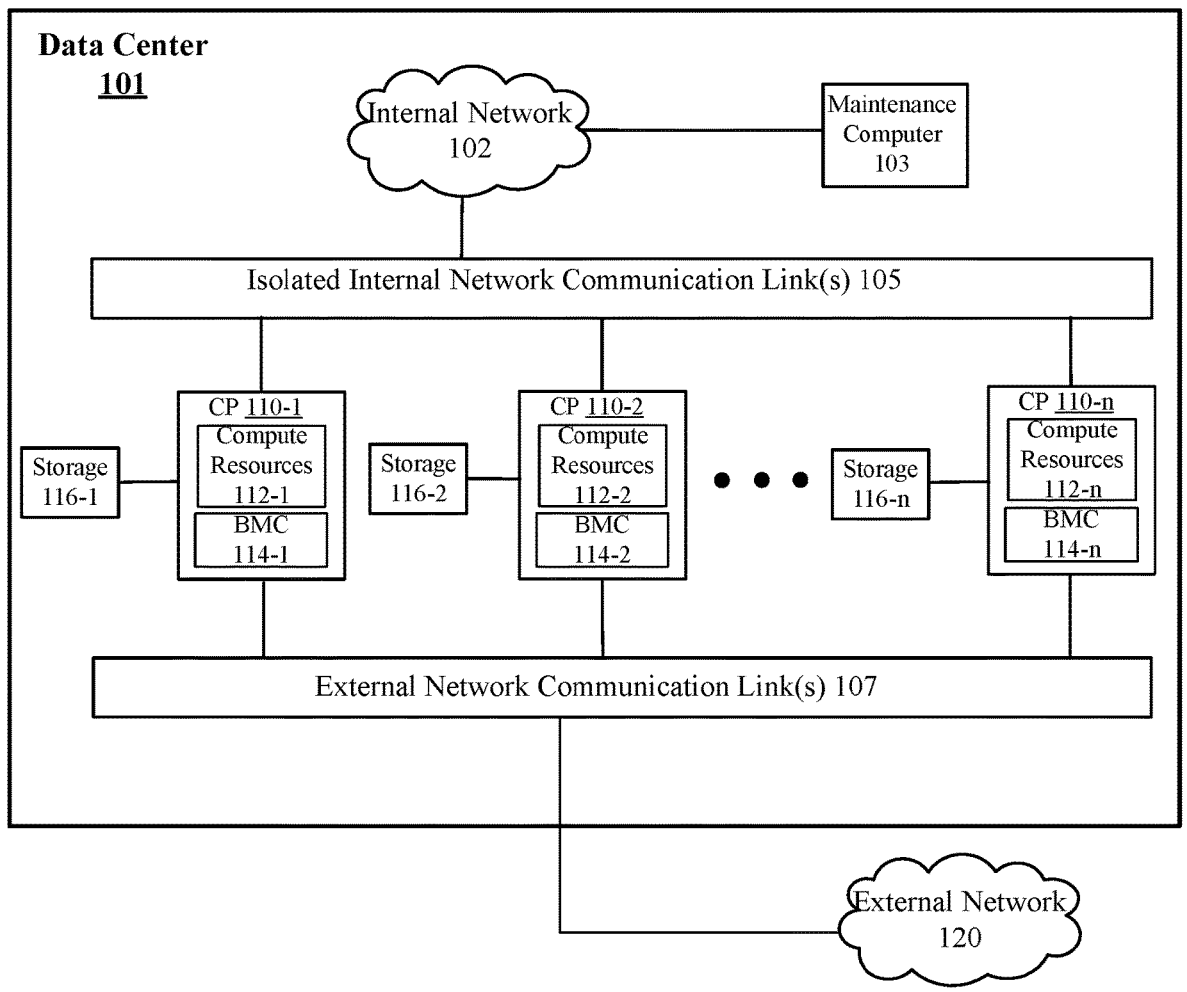
FIG. 1 illustrates an example first system.

FIG. 1 illustrates an example system 100. In some examples, as shown in FIG. 1, system 100 includes a data center 101. For these examples, data center 101 includes computer platforms (CPs) 110-1 to 110-n, where "n" represents any whole, positive integer >2, coupled with an internal network 102 via one or more isolated internal network communication link(s) 105 and with an external network 120 via one or more external network communication link(s) 107. As briefly mentioned above, an external network such as external network 120 may be unsafe or less secure compared to an isolated internal network such as internal network 102. Also, external network 120 may be part of an in-band data flow routed through external network communication link(s) 107 and used, for example, by clients of an operator for data center 101. Meanwhile, internal network 102 may be utilized by an operator of maintenance computer 103 to maintain, manage or control various operational aspects of CPs 110-1 to 110-n via an out-of-band (OOB) communication link or channel routed through isolated internal network communication link(s) 105.

According to some examples, as shown in FIG. 1, CPs 110-1 to 110-n may include respective compute resources 112-1 to 112-n. Compute resources 112-1 to 112-n may include processors, memory, network interfaces and other types of compute resources to support a plurality of VMs and host system software. The host system software may include, but is not limited to, an operating system (OS) and a hypervisor/VMM that may further support the plurality of VMs. As described in more detail below, a computing platform such as CP 110-1, 110-2 or 110-n may include a management controller such as respective BMCs 114-1 to 114-2. The management controller may include logic and/or features to facilitate direct OOB management between a management entity such as maintenance computer 103 and device drivers/software executed by VMs.

In some examples, the device drivers/software executed by VMs supported by computer resources 112-1, 112-2 or 112-n may utilize storage 116-1, 116-2 or 116-n to implement software RAID. Storage 116-1, 116-2 or 116-n may separately include multiple SSDs and/or HDDs for use to implement the software RAID. As described in more detail below, direct OOB management of the VM executed drivers/software used to implement software RAID may be facilitated via use of a multiple component transport protocol (MCTP) infrastructure such as described by the MCTP Base Specification, Version 1.3.0, published in November 2016 by the Distributed Management Task Force (DMTF), ("MCTP specification"). Also, in some examples, communication protocols utilized by elements of CPs 110-1 to 110-n or respective storage 116-1 to 116-n may communicate using protocols and interfaces described in industry standards or specifications (including progenies or variants) such as the Peripheral Component Interconnect (PCI) Express Base Specification, revision 4.0, version 1.0, published in October 2017 ("PCI Express specification" or "PCIe specification") and/or the Non-Volatile Memory Express (NVMe) Specification, revision 1.4, published in June 2019 ("NVMe specification"). Also, as described more below, various elements of a computing platform may utilize an MCTP infrastructure as well as PCIe/NVMe protocols for direct OOB management of the VM executed drivers/software.

Figure 2:
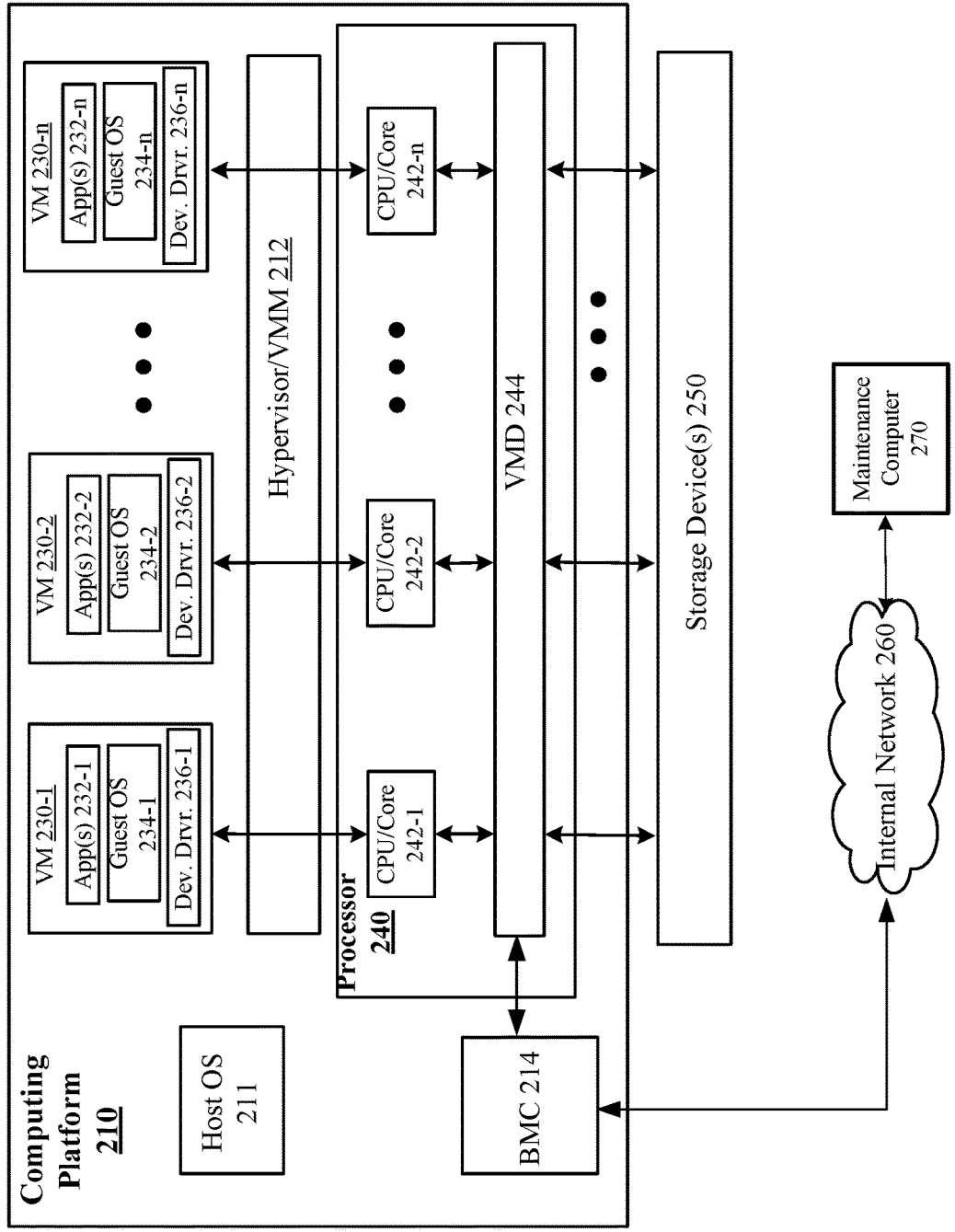
FIG. 2 illustrates an example second system.

FIG. 2 illustrates an example of system 200. According to some examples, as shown in FIG. 2, system 200 includes a computing platform 210 coupled to an internal network 260. For these examples, system 200 may be part of a data center and internal network 260 may represent elements of an internal data center network that communicatively couples elements of computing platform 210 to a maintenance computer 270. As described in more detail below, a management controller such as BMC 214 may include logic and/or features to facilitate direct OOB management by a data center management entity such as maintenance computer 270.

According to some examples, computing platform 210 may include various compute resources to support VMs separately executing one or more applications, guest OSs or device drivers such VMs 230-1 to 230-n. One type of compute resource is shown in FIG. 2 as a processor 240 composed of CPUs/Cores 242-1 to 242-n. Also, VMs 230-1 to 230-n at computing platform 210 may be managed or controlled by a hypervisor/VM manager (VMM) such as hypervisor/VMM 212. Hypervisor/VMM 212 may also work in coordination with host OS 211 to configure and/or manage at least some operational aspects of VMs 230-1 to 230-n.

In some examples, as shown in FIG. 2, processor 240 may include a volume management device (VMD) 244. For these examples, VMD 244 may include circuitry of processor 240 to allow for software/device drivers such as device drivers 236-1 to 236-n or App(s) 232-1 to 2321-n of VMs 230-1 to 230-n to directly access, manage or control at least portions of one or more storage device(s) 250 that may be resident on computing platform 210 and/or coupled with computing platform 210. Direct access to the one or more storage device(s) 250 may be enabled first by hypervisor/VMM 212 and/or host OS 211 assigning physical memory addresses for one or more storage device(s) included in storage device(s) 250 to individual VMs from among VMs 230-1 to 230-n. The separately assigned physical memory addresses to the individual VMs may be referred to as "protection domains" or "domains". Domains may be established based on instructions to VMD 244 from a basic input/output system (BIOS), e.g., during startup of system 200. The separately assigned domains may be enforced by elements of processor 240 such as VMD 244. Once a VM is assigned a domain, software/devices drivers of the VM are allowed to only directly access, manage or control the physical memory addresses included in its assigned domain. Other VMs are not allowed to directly access, manage or control these physical memory addresses. As described more below, logic and/or features of VMD 244 may utilize these assigned domains and an MCTP infrastructure to facilitate direct OOB management of drivers/software executed by a given VM.

According to some examples, software/device drivers such as device drivers 236-1 to 236-n or App(s) 232-1 to 232-N of VMs 230-1 to 230-n having an ability to directly access one or more storage device(s) 250 may enable a type of storage solution option provided by Intel® Corporation. That storage solution option is referred to as virtual RAID on central processing unit (CPU) (VROC). VROC may provide an enterprise, hybrid RAID solution, designed for storage devices arranged to operate according to the NVMe specification. In some examples, software/device drivers of VMs 230-1 to 230-n may be able to utilize VROC capabilities to implement a virtualized RAID storage solution based on VMD 244's capability to enforce domains assigned to VMs 230-1 to 230-n for direct access to one or more storage device(s) 250. For these examples, direct OOB management for managing or controlling some aspects of the virtualized RAID storage solution may allow an operator of maintenance computer 270 to collect information about computing platform 210's capabilities, trigger appropriate actions for the software/device drivers of VMs 230-1 to 230-n (e.g., RAID create, RAID rebuild, flush cache, migrate data, etc.), monitoring drive health state(s) of storage device(s) 250, monitoring RAID state(s) or updating storage drive firmware for storage device(s) 250.

In some examples, processor 240 including CPUs/cores 242-1 to 242-n may represent, either individually or collectively, various commercially available processors. The various commercially available processors may include, but are not limited to, processors designed to support or capable of supporting Intel® VROC including without limitation an Intel® Xeon® or Intel® Xeon Phi® processors; and similar processors.

Figure 3:
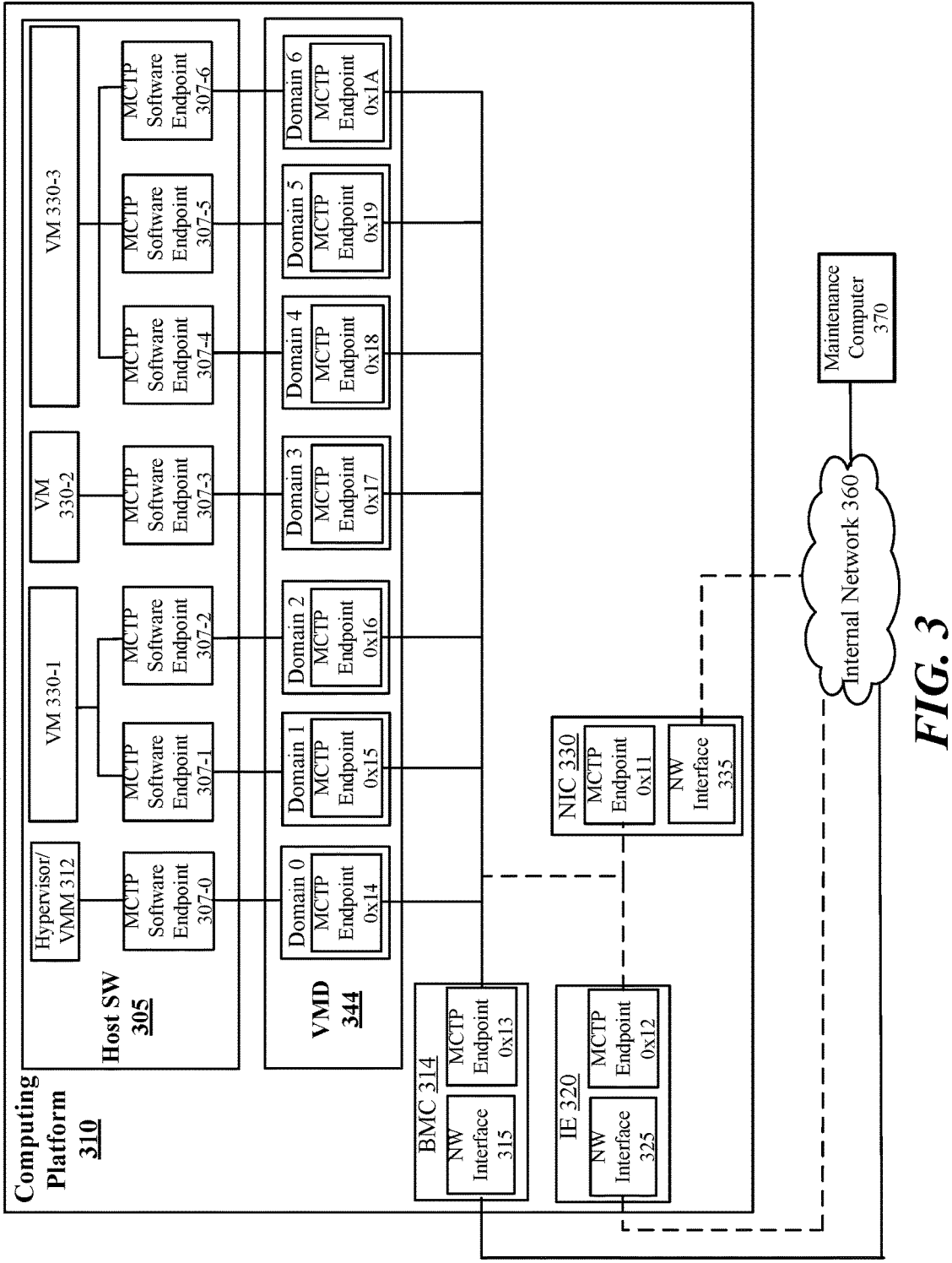
FIG. 3 illustrates an example third system.

FIG. 3 illustrates an example system 300. In some examples, as shown in FIG. 3, system 300 includes a computing platform 310 coupled to an internal network 360. For these examples, similar to system 200 shown in FIG. 2, system 300 may be part of a data center and internal network 360 may represent elements of an internal data center network that communicatively couples elements of computing platform 310 to a maintenance computer 370. As described in more detail below, a management controller such as BMC 314 may include logic and/or features to facilitate direct OOB management by a data center management entity such as maintenance computer 370. In other examples, another type of generic management controller such as an innovation engine (IE) 320 may include logic and/or features to facilitate direct OOB management by a data center management entity such as maintenance computer 370. For either of these examples, as described more below, an MCTP infrastructure may be utilized to facilitate the direct OOB management to enable maintenance computer 370 to control or manage elements of computing platform 310.

According to some examples, as shown in FIG. 3, computing platform 310 includes host software (SW) 305, a VMD 344, BMC 314, IE 320 and a network interface card (NIC) 330. For these examples, VMD 344 may be circuitry of a processor (not shown in FIG. 3) supporting VMs 330-1 to 330-3 (e.g., similar to VMD 244 of processor 240 shown in FIG. 2). VMD 344 may work in coordination with hypervisor/VMM 312 to assign domains 0-6 for elements of VMs 330-1 to 330-3 to directly access one or more storage devices (not shown in FIG. 3). Assigned domains 0-6 may be separately associated with a same or different PCIe function. For example, the PCIe function may include access to the one or more storage devices using NVMe communication protocols (e.g., to implement a VROC storage solution). As shown in FIG. 3, some VMs such as VM 330-1 or VM 330-3 may have software/device drivers associated with multiple PCIe functions and/or domains. Hence, VM 330-1 has MCTP software endpoints 307-1 and 307-2 associated with respective domains 1 and 2 enforced by VMD 344 and VM 330-3 has MCTP software endpoints 307-4 to 307-6 associated with respective domains 4-6 enforced by VMD 344.

Also, as described in more detail below, logic and/or features of BMC 314, VMD 344, or MCTP software endpoints 307 for domains 0-6 may use an MCTP infrastructure to set up MCTP endpoints to serve as a destination or a source of MCTP packets or messages arranged according to the MCTP specification and communicated using the MCTP transport protocol. The MCTP packets or messages may be routed through these MCTP endpoints and may include information (e.g., requests or commands) to enable direct OOB management of software/device drivers executed by VMs 330-1 to 330-3. The direct OOB management, for example, by an operator of maintenance computer 370 coupled with elements of computing platform 310 via internal network 360.

In some examples, as shown in FIG. 3, MCTP endpoints 0x11 to 0x1A for respective NIC 330, IE 320, BMC 314 and domains 0-6 may represent MCTP endpoint identifiers (EIDs). MCTP endpoints 0x11 to 0x1A may represent hexadecimal-based addresses used to route MCTP messages to a specific MCTP endpoint. For example, MCTP packets or messages destined for MCTP software endpoint 307-3 may be routed through a network (NW) interface 315 of BMC 314 coupled with internal network 360, through MCTP endpoint 0x13 and then through MCTP endpoint 0x17 to reach MCTP software endpoint 307-3. Alternatively, the MCTP packets or messages may be routed through a NW interface 325 of IE 320 and through MCTP endpoint 0x12 or through a NW interface 335 of NIC 330 and through MCTP endpoint 0x11.

Figure 4:
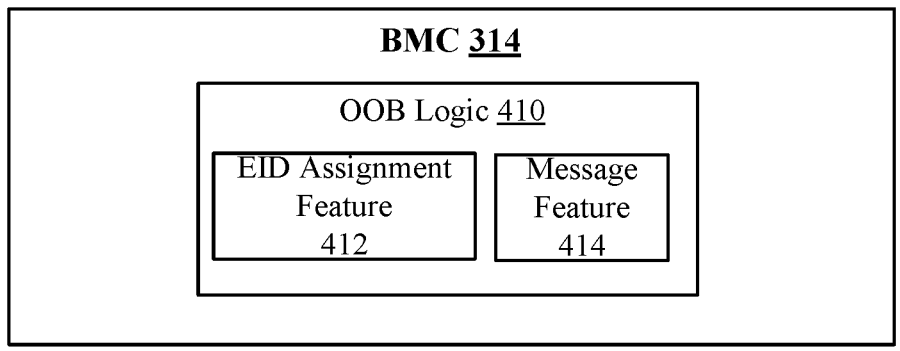
FIG. 4 illustrates an example baseboard management controller.

FIG. 4 illustrates an example of BMC 314. In some examples, as shown in FIG. 4, BMC 314 includes OOB logic 410. For these examples, OOB logic 410 may include an EID assignment feature 412 and a message feature 414 for use as part of an MCTP infrastructure to facilitate OOB management by a data center management entity such as maintenance computer 370. In other examples, not shown, similar OOB management logic to OOB logic 410 may be included in a different type of management controller. For example, the OOB management logic may be included in IE 320. For either of these examples of a management controller, OOB logic 410 may be associated with or function as part of a MCTP bus owner.

According to some examples, BMC 314 may be configured as an MCTP bus owner for computing platform 310. For these examples, EID assignment feature 412 of OOB logic 410 may serve a first function of BMC 314's MCTP bus master role and that is to distribute EIDs to MCTP endpoints. MCTP EIDS may be system-wide unique IDs used by an MCTP infrastructure to address MCTP endpoints and for routing messages across multiple buses in the system (e.g., across PCIe buses). One EID may be assigned to a given physical address. For example, one EID of 0x13 is assigned as the physical address for BMC 314's MCTP endpoint and one EID of 0x14 is assigned as the physical address for domain 0 of VMD 344. In some examples, each physical address of a domain of VMD that is assigned as an MCTP endpoint may be associated with or mapped to a physical PCIe data channel controlled by VMD 344 and coupled with one or more storage devices. The physical PCIe data channel of the domain, for example, may provide a software/device driver of a VM associated or assigned to the domain direct access to the one or more storage devices via the physical PCIe data channel. EID assignment feature 412 may maintain a list (e.g., in a lookup table) of assigned EIDs to facilitate routing of MCTP packets or messages. In some examples, OOB logic 410 may cause the list to be sent to a data center management entity such as maintenance computer 370 for use in generating MCTP packets or messages addressed to or targeted to the various MCTP endpoints of computing platform 310. This list may provide a way for maintenance computer 370 to resolve an EID into a physical address used for delivering request MCTP packets or messages targeted to the various MCTP endpoints of computing platform 310 and for determining the physical address or source of response MCTP packets or messages.

In some examples, message feature 414 may generate, respond to, or forward MCTP packets or messages. As described more below, message feature 414 may be capable of generating, responding or forwarding MCTP packets or messages using an example MCTP message format that may include various fields described in the MCTP specification. In some examples, MCTP packets or messages addressed to BMC 314's MCTP endpoint EID may be interpreted as being targeted to a data center management entity such as maintenance computer 370. For these examples, message feature 414 may cause these messages to be forwarded to the data center management entity. In other examples, an EID for maintenance computer 370 may be known to all MCTP endpoints on a computing platform such as computing platform 310 and that EID will be used by message feature 414 to forward messages.

Figure 5:
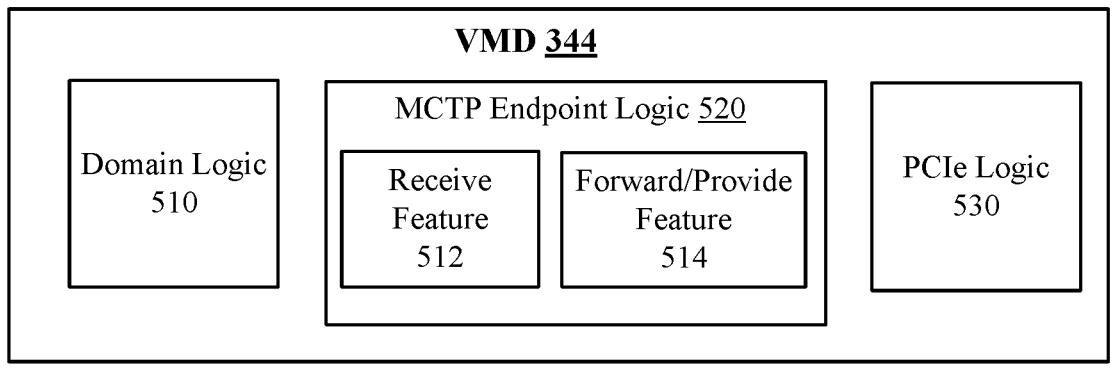
FIG. 5 illustrates an example volume management device.

FIG. 5 illustrates an example VMD 344. In some examples, as shown in FIG. 5, VMD 344 includes a domain logic 510, an MCTP endpoint logic 520 or a PCIe logic 530. Domain logic 510 may work in coordination with a hypervisor/VMM to enforce domains assigned to VMs for direct access to one or more storage devices. MCTP endpoint logic 520 may include a receive feature 512 and a forward/provide feature 514. Receive feature 512 may receive MCTP messages destined for or generated by MCTP software endpoints associated with assigned domains. Forward/provide feature 514 may use EID information included in received MCTP messages to forward/provide these message towards their target or destination. PCIe logic 530 may be capable of managing physical PCIe lanes associated with each of the domains assigned by domain logic 510. In some examples, PCIe logic 530 may manage a physical interface to transmit PCIe or NVMe packets to storage devices accessible via assigned domains.

Figure 6:
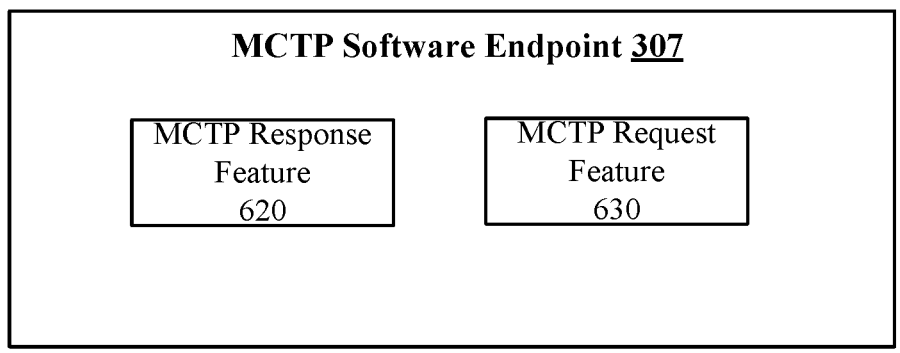
FIG. 6 illustrates an example management component transport protocol (MCTP) software endpoint.

FIG. 6 illustrates an example MCTP software endpoint 307. According to some examples, as shown in FIG. 6, MCTP software endpoint 307 includes an MCTP response feature 620 and an MCTP request feature 630. MCTP response feature 620 may generate a response to a received MCTP packet or message (e.g., sent from maintenance computer 370 through BMC 314). MCTP request feature 630 may generate a request to be included in an MCTP packet or message. As described more below, a Vender Defined—PCI message type indicated in either a request or response MCTP message as described in the MCTP specification may serve as an indication that the message body includes PCIe or NVMe information arranged according to communication protocols described in the PCIe or NVMe specifications. The PCIe or NVMe formatted information may be used, for example, to facilitate direct OOB management by a data center management entity for software/device drivers executed by VMs having an MCTP software endpoint to control or manage storage devices directly accessible to the software/device drivers (e.g., via PCIe channels control by a VMD).

Figure 7:
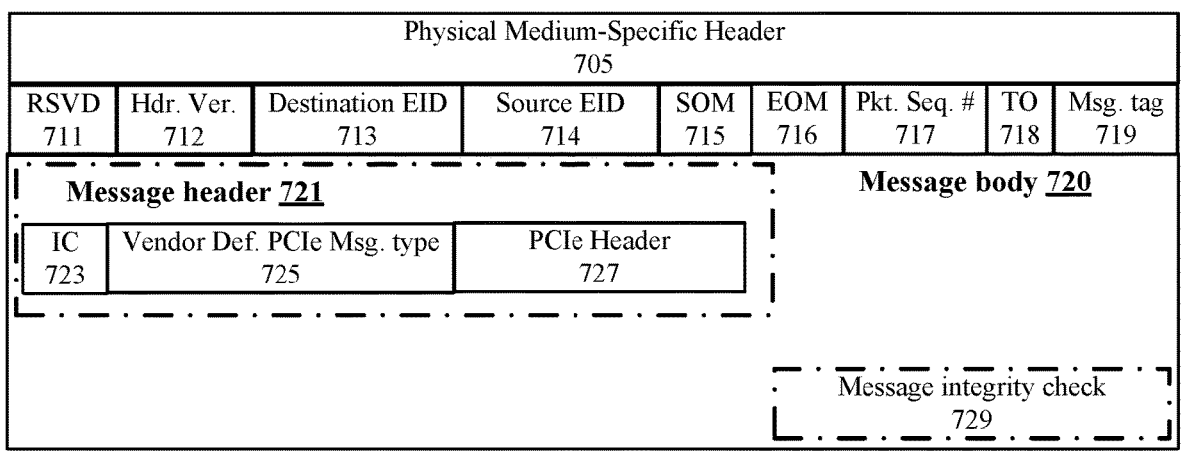
FIG. 7 illustrates an example MCTP packet format.

FIG. 7 illustrates an example MCTP packet format 700. In some examples, MCTP packet format 700 may be used to convey information for MCTP messages to or from MCTP endpoints of a computing platform having a management controller (e.g., BMC 314 or IE 320) serving as an MCTP bus owner as part of an MCTP infrastructure used to enable direct OOB management of drivers/software executed by a given VM supported by compute resources of the computing platform.

In some examples, physical medium-specific header 705 may include information to represent physical addressing and framing information that is used for transferring MCTP packets between devices having MCTP endpoints using a particular type of medium (e.g., a PCIe bus). In some examples, a typical use of physical medium-specific header 705 may be to hold per-packet data integrity fields (e.g., CRC, checksum, etc.) that may be required by the particular physical medium.

According to some examples, fields 711 to 719 may be considered as an example of an MCTP transport header. For these examples, these fields may be common fields that are always present regardless of the physical medium over which MCTP packets are being transported. RSVD 711 may be reserved for future use in subsequent revisions to the MCTP specification. Header (Hdr.) version (Ver.) 712 may identify a format, physical framing, and data integrity mechanism for use to transfer or transmit the MCTP common fields in MCTP packets on a given physical medium. For example, a PCIe physical layer (PHY) specification such as the PHY Interface for PCI Express (PIPE) Architecture, Rev. 5.2, published in February 2019 by Intel® Corporation. Destination EID 713 may indicate an EID for an MCTP endpoint to receive the MCTP packet. Source EID 714 may indicate an EID for an MCTP endpoint that is the originator or generator of the MCTP packet. Start of message (SOM) 715 may indicate whether the MCTP packet is the first packet of an MCTP message. End of message (EOM) 716 may indicate whether the MCTP packet is the last packet of the MCTP message. Packet (Pkt.) sequence (Seq.) number (#) 717 may be for MCTP messages that span multiple MCTP packets. Tag owner (TO) 718 may identify whether a message tag for an MCTP message was originated by an MCTP endpoint that is a source of the MCTP message or by an MCTP endpoint that is a destination of the MCTP message. TO 718 may additionally or alternatively indicate whether an MCTP message is part of a "request" or a "response". Message (msg.) tag 719 may identify, along with SOM 715 and TO 718 a unique message at the MCTP transport level.

In some examples, message body 720 and subfields of message body 720 may represent a MCTP packet payload of an MCTP message. Integrity check (IC) 723, vendor defined (def.) PCIe msg. type 725 and PCI Header 727 may be considered as a message header 721 for message body 720. IC 723 may indicate whether an MCTP message is covered by an overall MCTP message payload integrity check. Vendor def. PCIe msg. type 725 indicates that the type of payload contained in a message data portion of the MCTP packet is associated with a vender defined PCIe message type. In some examples, vendor def. PCI msg. type 725 indicates a support vendor defined message (VDM) where a vendor may be identified using a PCI-based vendor ID. PCIe header 727 may indicate additional header information associated with PCIe message types. This may be included in a first packet of an MCTP message, but the PCIe specification may define contents of this field for any packet of the MCTP message. Message integrity check 729 may indicate an integrity check over contents of message body 720. Message integrity check 729, for example, may be included in the last bytes of message body 720.

Figure 8:
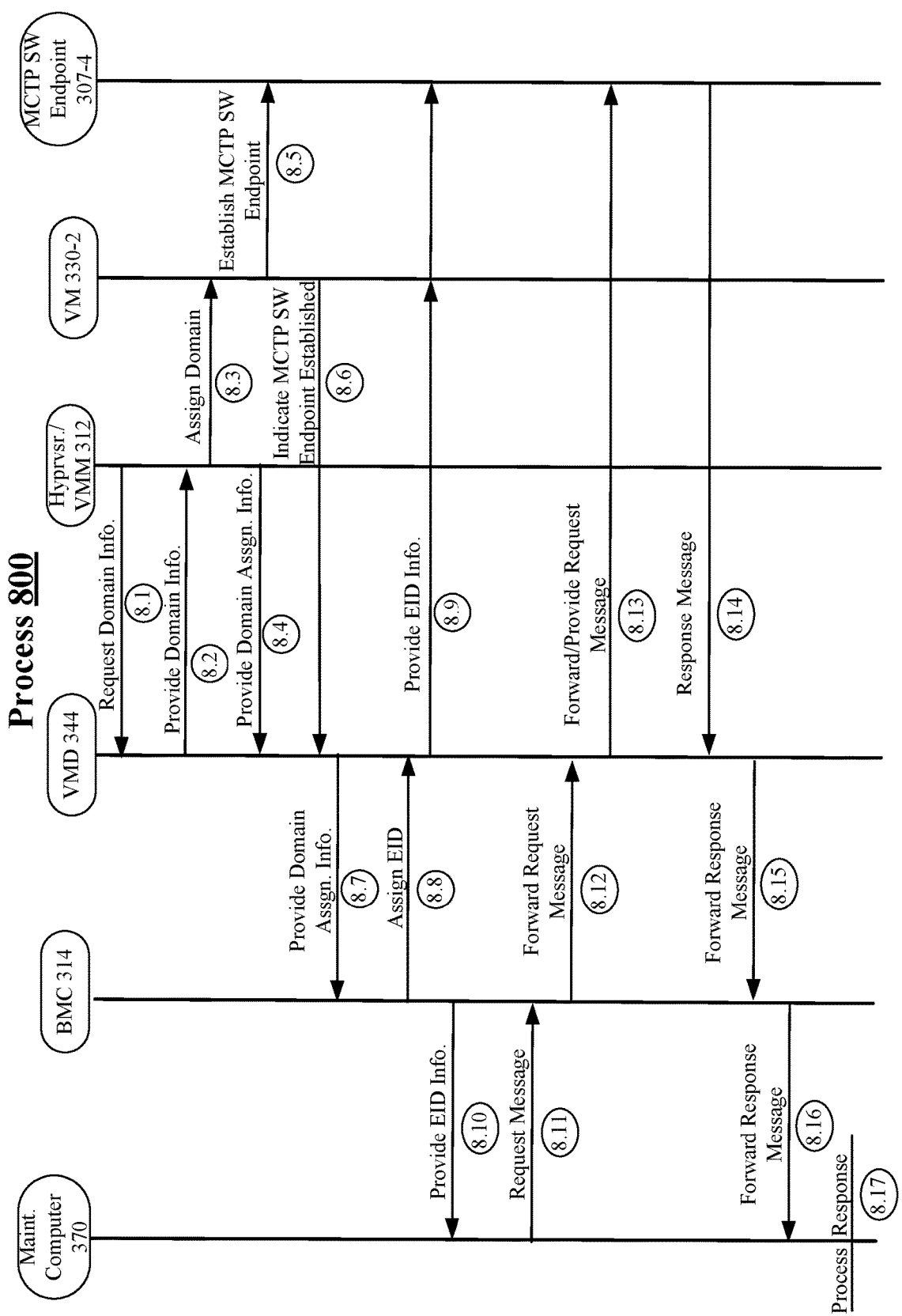
FIG. 8 illustrates an example process.

FIG. 8 illustrates an example process 800. In some examples, process 800 may depict how an MCTP infrastructure may be used to provide direct OOB management of VM executed drivers/software. For these examples, process 800 may include use of various elements shown in FIG. 3-6 such as computing platform 310, hypervisor/VMM 312, VM 330-2, MCTP SW endpoint 307-4, VMD 344, BMC 314, internal network 360 or maintenance computer 370. Process 800 may also include use of example MCTP packet format 700 shown in FIG. 7. Examples are not limited to these elements or example formats shown in FIGS. 3-7.

Beginning at process 8.1 (Request Domain Info.), hypervisor/VMM 312 of computing platform 310 may work in coordination with logic and/or features of VMD 344 such as domain logic 510 to request domain information. In some examples, separate domains may be established for use by VMD 344 (e.g., based on BIOS instructions). In some examples, at least a portion of the established domains may be for use by respective PCIe functions assigned to VMs. The respective PCIe functions may be associated with accessing, managing or controlling one or more storage devices (e.g., SSDs and/or HDDs) resident on or coupled to computing platform 310 (e.g., via use of PCIe and/or NVMe communication protocols, interfaces or physical links). For these examples, domain logic 510 may allocate separate portions of physical memory addresses of the storage devices to each domain.

Moving to process 8.2 (Provide Domain Info.), logic and/or features of VMD 344 such as domain logic 510 may provide domain information responsive to hypervisor/VMM 312's request for domain information. According to some examples, the domain information may indicate what domains may have been established for use for PCIe functions associated with accessing, managing or controlling one or more storage devices.

Moving to process 8.3 (Assign Domain), hypervisor/VMM 312 may assign a domain to VM 330-2 for use by at least one PCIe function assigned to VM 330-2 associated with accessing, managing or controlling one or more storage devices. In some examples, the assigned domain may be domain 3 as shown in FIG. 3.

Moving to process 8.4 (Provide Domain Assgn. Info.), hypervisor/VMM 312 may provide domain assignment information to VMD 344. In some examples, the domain assignment information may indicate that domain 3 has been assigned to VM 330-2 for use by a PCIe function assigned to VM 330-2. VMD 344 may then allow only software/device drivers executed by VM 330-2 to directly access, manage or control the allocated separate portions of the physical memory addresses include in domain 3.

Moving to process 8.5 (Establish MCTP SW Endpoint), logic and/or features of VM 330-2 such as software or a storage device driver used to implement a PCIe function may establish MCTP SW endpoint 307-4. In some example, the PCIe function may be for software of VM 330-2 to implement a storage solution such as Intel® VROC that may include implementing various virtualized RAID actions on the physical memory addresses included in domain 3. For these examples, the virtualized RAID actions may include, but are not limited to, a RAID create action, a RAID rebuild action, a flush cache action or a migrate data action. In other examples, the PCIe function may be for a storage device driver of VM 330-2 to perform various monitoring activities for one or more storage devices having the physical memory addresses included in domain 3. For example, monitoring storage drive health state(s) or monitoring RAID state(s). Establishment of MCTP SW endpoint 307-4 may be a first link for direct OOB management of a software or a storage driver executed by VM 330-2 using an MCTP infrastructure.

Moving to process 8.6 (Indicate MCTP SW Endpoint Established), software or a storage device driver of VM 330-2 may indicate to VMD 344 that MCTP SW endpoint 307-4 has been established and will utilize domain 3. In some examples, VMD 344 may than associate MCTP SW endpoint 307-4 with domain 3.

Moving to process 8.7 (Provide Domain Assgn. Info.), logic and/or features of VMD 344 such as domain logic 510 may provide domain assignment information indicating assignment of domain 3 to VM 330-2. According to some examples, the domain assignment information may also indicate that an MCTP SW endpoint has been established by VM 330-2.

Moving to process 8.8 (Assign EID), OOB logic 410 of BMC 314 may utilize EID assignment feature 412 to assign an MCTP EID to domain 3. For example, as shown in FIG. 3, domain 3 has an EID of 0x17. In some examples, OOB logic 410 may also utilize message feature 412 to send an MCTP packet using example MCTP packet format 700 that includes a Null Destination EID in destination EID 713 to indicate that the newly assigned EID is included in the message body of the MCTP packet.

Moving to process 8.9 (Provide EID Info.), logic and/or features of VMD 344 such as domain logic 510 may provide the assigned EID information to MCTP SW endpoint 307-4. In some examples, the EID information is provided to indicate to the software/device drivers associated with MCTP SW endpoint 307-4 that any MCTP request or response messages generated by or sourced from MCTP SW endpoint 307-4 (e.g., using MCTP packet format 700) are to use the EID assigned to domain 3 as MCTP SW endpoint 307-4's EID.

Moving to process 8.10 (Provide EID Info.), OOB logic 410 of BMC 314 may provide or send the EID information that has an eventual destination of MCTP SW endpoint 307-4 to maintenance computer 370.

Moving to process 8.11 (Request Message), an operator of maintenance computer 370 may generate a request message destined for MCTP SW endpoint 307-4. In some examples, the operator may use the EID information provided from OOB logic 410 to route messages associated with direct OOB management of MCTP SW endpoint 307-4 via OOB links routed via internal network 360 and to BMC 314. In some examples, the request message may include an encapsulated MCTP packet that uses example MCTP packet format 700. The MCTP packet may be encapsulated, for example, by an Ethernet communication protocol to route the request message to BMC 314 via internal network 360.

Moving to process 8.12 (Forward Request Message), OOB logic 410 of BMC 314 such as message feature 414 may forward the request message sent from maintenance computer 370 to MCTP endpoint 0x17 for domain 3 at VMD 344. In some examples, message feature 414 may remove encapsulated information and forward the MCTP packet that uses example MCTP packet format 700. For these examples, the message body 720 may include request data for the request message that may be a means for direct OOB management of VM 330-2 and the software/device driver executed by VM 330-2. For example, the request data may trigger actions for the software/device driver to implement PCIe functions that may be associated with Intel® VROC or associated with monitoring solid state drives having physical memory addresses allocated to domain 3.

Moving to process 8.13 (Forward/Provide Request Message), MCTP endpoint logic 520 of VMD 344 may use receive feature 512 to receive the request message sent/forwarded from BMC 314 and then use forward/provide feature 514 to cause the request message to be forwarded to MCTP SW endpoint 307-4. In other examples, rather than forward the request message, forward/provide feature 514 may indicate receipt of the request message and may cause the request message to be temporarily stored in a cache or queue associated with MCTP endpoint 0x17 for domain 3 in order to provide the request message. The cache or queue, for example, may be included in an on-die memory for the processor that includes VMD 344. For these other examples, the indication may include a pointer to a memory address of the cache or queue where MCTP SW endpoint 307-4 may obtain the message.

Moving to process 8.14 (Response Message), logic and/or features of MCTP SW endpoint 307-4 such as MCTP response feature 620 may generate a response message and send the response message to MCTP endpoint 0x17 for domain 3 at VMD 344. According to some example, the response message may be included in one or more MCTP packets using example MCTP packet format 700. For these examples, to send the response message may include MCTP response feature 620 causing the one or more MCTP packets to be stored to the cache or queue associated with MCTP endpoint 0x17 for domain 3 and then indicating to VMD 344 via a pointer to a memory address of the cache or queue where the one or more MCTP packets are located.

Moving to process 8.15 (Forward Response Message), MCTP endpoint logic 520 of VMD 344 may use receive feature 512 to receive the response message sent from MCTP SW endpoint 307-4 and then use forward/provide feature 514 to cause the response message to be forwarded to BMC 314.

Moving to process 8.16 (Forward Response Message), OOB logic 410 of BMC 314 may use message feature 414 to receive the response message and then forward the response message to maintenance computer 370. In some examples, message feature 414 may encapsulate a response message included in one or more MCTP packets in a communication protocol utilized by internal network 360 in order to forward the response message to maintenance computer 370.

Moving to process 8.17 (Process Response), a user of maintenance computer 370 may process the response to determine whether direct OOB management of MCTP SW endpoint 307-4 was successful. If the successful, process 800 then comes to an end. If unsuccessful, process 800 may move to process 8.8 to send another request message.

Figure 9:
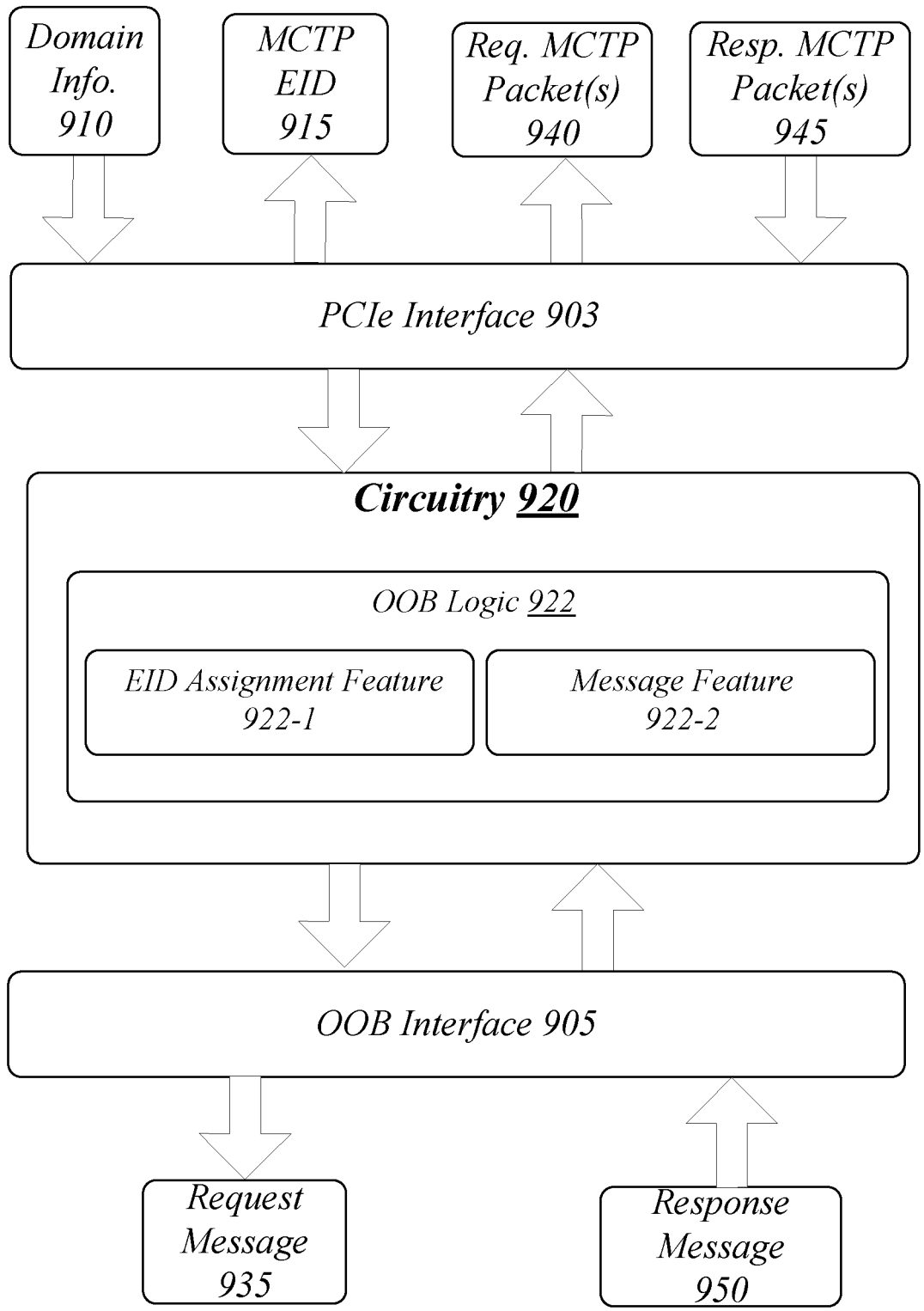
FIG. 9 illustrates an example first apparatus.

FIG. 9 illustrates an example block diagram for apparatus 900. Although apparatus 900 shown in FIG. 9 has a limited number of elements in a certain topology, it may be appreciated that apparatus 900 may include more or less elements in alternate topologies as desired for a given implementation.

According to some examples, apparatus 900 may be supported by circuitry 920 of a management controller for a computing platform (e.g., a BMC). For these examples, circuitry 920 may be an ASIC, FPGA, configurable logic, processor, processor circuit, CPU, or one or more cores of a CPU. Circuitry 920 may be all or at least a part of any of various commercially available processors. Circuitry 920 may be arranged to execute logic or one or more software or firmware implemented modules, components or features of the logic. It is worthy to note that "a" and "b" and "c" and similar designators as used herein are intended to be variables representing any positive integer. Thus, for example, if an implementation sets a value for a=2, then a complete set of software or firmware for modules, components of logic 922-$a$ may include feature 922-1 or feature 922-2. The examples presented are not limited in this context and the different variables used throughout may represent the same or different integer values. Also, "module", "component" or "feature" may also include software/firmware stored in computer-readable media, and although types of features are shown in FIG. 9 as discrete boxes, this does not limit these types of features to storage in distinct computer-readable media components (e.g., a separate memory, etc.).

According to some examples, apparatus 900 may include a PCIe interface 903 and an OOB interface 905. PCIe interface 903 may operate in compliance with the PCIe specification and may be coupled to a PCIe transmission medium to transmit or receive MCTP packets to/from MCTP endpoints of a computing platform. OOB interface 905 may be an interface for an OOB communication link coupled with the computing platform that includes apparatus 900. In some examples, OOB interface 905 may operate in compliance with one or more industry standard specifications such as Ethernet standards promulgated by the Institute of Electrical and Electronics Engineers (IEEE). For example, one such Ethernet standard promulgated by IEEE may include, but is not limited to, IEEE 802.3-2018, Carrier sense Multiple access with Collision Detection (CSMA/CD) Access Method and Physical Layer Specifications, Published in August 2018 (hereinafter "IEEE 802.3 specification").

In some example, apparatus 900 may also include an OOB logic 922 having an EID assignment feature 922-1 and a message feature 922-2. EID assignment feature 922-1 of OOB logic 922 may be executed or supported by circuitry 920 to receive domain information 910 through PCIe interface 903 for a domain for use by software or a device driver executed by a VM (e.g., sent from a VMD). Domain information 910 may indicate that the domain is mapped to physical memory addresses of one or more storage devices coupled with the computing platform via which the software or the device driver is able to directly access, manage or control at least a portion of the one or more storage devices.

According to some examples, EID assignment feature 922-1 of OOB logic 922 may be executed or supported by circuitry 920 to assign an MCTP EID to the domain. For these examples, EID assignment feature 922-1 may send the assigned MCTP EID in MCTP EID 915 through PCIe interface 903 to a VMD that had established the domain in order to create an addressable MCTP endpoint for the domain.

In some examples, message feature 922-2 of OOB logic 922 may be executed or supported by circuitry 920 to receive request message 935 from a management entity for a data center that includes the computing platform. For these examples, request message 935 may be received through OOB interface 905 coupled with the OOB communication link. Request message 935 may include information direct to the software or the device driver executed by the VM.

According to some examples, message feature 922-2 of OOB logic 922 may be executed or supported by circuitry 920 to forward request message 935 in one or more request MCTP packets 940 that indicate the assigned MCTP EID is a destination MCTP endpoint for request message 935. For these examples, request MCTP packets 940 may be forwarded through PCIe interface 903.

In some examples, message feature 922-2 of OOB logic 922 may be executed or supported by circuitry 920 to receive a response message from the software or the device driver generated responsive to the information included in the request message directed to the software or the device driver, the response message included in one or more response MCTP packets 945 that indicate the assigned MCTP EID is a source MCTP endpoint for the response message. For these examples, response MCTP packets 945 may be received through PCIe interface 903.

In some examples, message feature 922-2 of OOB logic 922 may be executed or supported by circuitry 920 to forward the response message in response message 950 to the management entity through OOB interface 905 coupled with the OOB communication link. Response message 950, for example, may be encapsulated within one or more Ethernet packets in order to forward the one or more response MCTP packets 945 received from the software or device driver.

Various components of apparatus 900 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 10 illustrates an example logic flow 1000. Logic flow 1000 may be representative of some or all of the operations executed by one or more logic, features, or devices described herein, such as apparatus 900. More particularly, logic flow 900 may be implemented by at least EID assignment feature or message feature 922-2 of OOB logic 922.

According to some examples, logic flow 1000 at block 1002 may receive, at a management controller for a computing platform, domain information for a domain for use by software or a device driver executed by a VM, the domain information indicating that the domain is mapped to physical memory addresses of one or more storage devices coupled with the computing platform via which the software or the device driver is able to directly access, manage or control at least a portion of the one or more storage devices. For these examples, EID assignment feature 922-1 may receive the domain information via PCIe interface 903.

In some examples, logic flow 1000 at block 1004 may receive a request message from a management entity for a data center that includes the computing platform, the request message received via an OOB communication link and including information directed to the software or the device driver. For these examples, message feature 922-2 may receive the request message through OOB interface 905.

According to some examples, logic flow 1000 at block 1006 may forward the request message in one or more MCTP packets that indicate the assigned MCTP EID is a destination MCTP endpoint for the request message. For these examples, message feature 922-2 may cause the request message to be forwarded through PCIe interface 903.

FIG. 11 illustrates an example storage medium 1100. In some examples, storage medium 1400 may be an article of manufacture. Storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
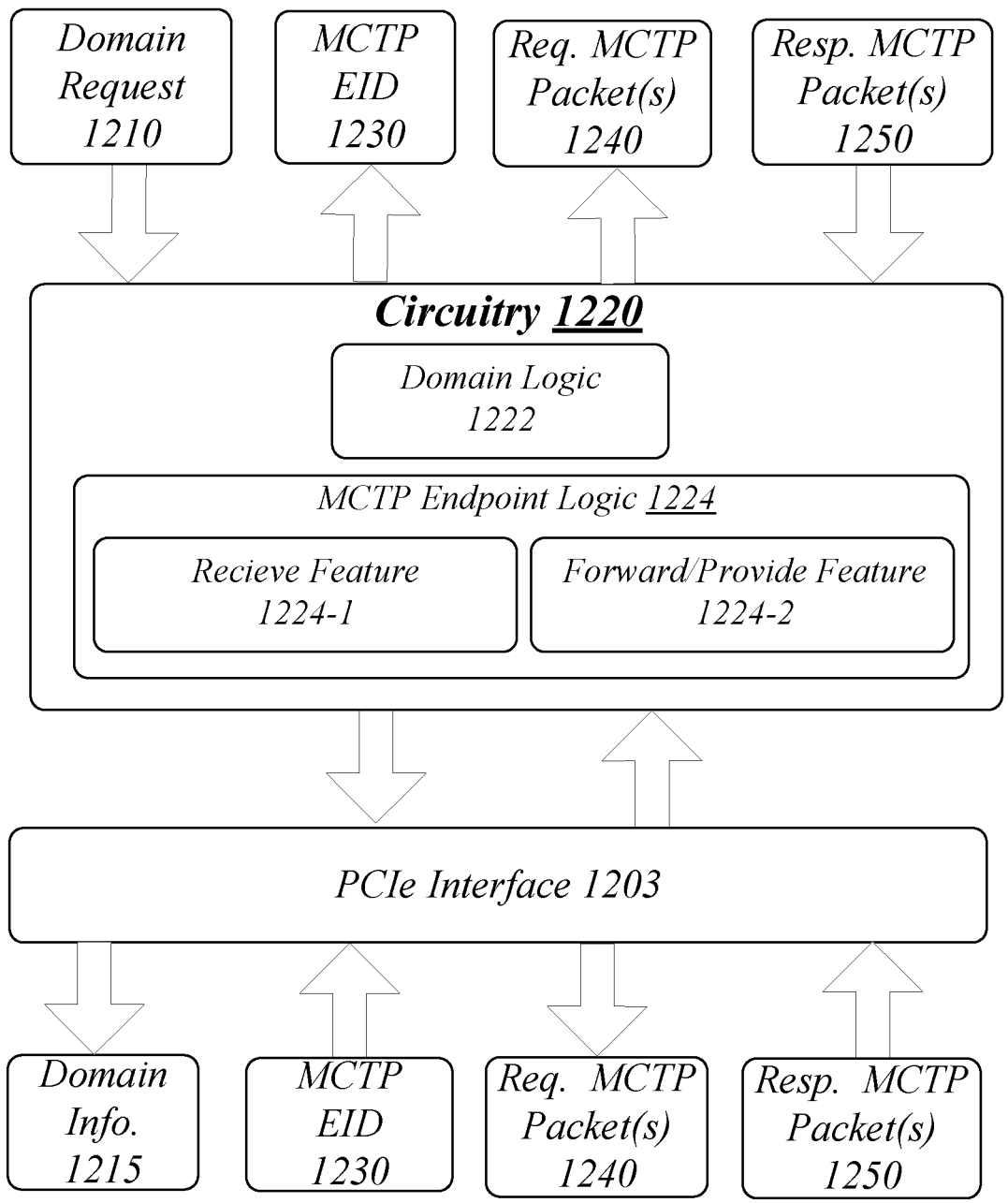
FIG. 12 illustrates an example second apparatus.

FIG. 12 illustrates an example block diagram for apparatus 1200. Although apparatus 1200 shown in FIG. 12 has a limited number of elements in a certain topology, it may be appreciated that the apparatus 1200 may include more or less elements in alternate topologies as desired for a given implementation.

According to some examples, apparatus 1200 may be supported by circuitry 1220 of a processor for a computing platform. For these examples, circuitry 1220 may be an ASIC, FPGA, configurable logic, processor circuit, or one or more cores of a CPU. Circuitry 920 may be a part of any of various commercially available processors such as, but not limited to, Intel® Xeon® or Intel® Xeon Phi® processors. Circuitry 1220 may be arranged to execute logic one or more software or firmware implemented modules, components or features of the logic. It is worthy to note that "a" and "b" and "c" and similar designators as used herein are intended to be variables representing any positive integer. Thus, for example, if an implementation sets a value for a=2, then a complete set of software or firmware for modules, components of logic 1224-a may include feature 1224-1 or feature 1224-2. The examples presented are not limited in this context and the different variables used throughout may represent the same or different integer values. Also, "module", "component" or "feature" may also include software/firmware stored in computer-readable media, and although types of features are shown in FIG. 12 as discrete boxes, this does not limit these types of features to storage in distinct computer-readable media components (e.g., a separate memory, etc.).

In some examples, apparatus 1200 may include a PCI interface 1203 that may operate in compliance with the PCIe specification and may be coupled to a PCIe transmission medium to transmit or receive MCTP packets to/from MCTP endpoints of a computing platform having a management controller.

According to some examples, apparatus 1200 may include a domain logic 1222. Domain logic 1222 may be executed or supported by circuitry 1220 to receive assignment information for assignment of a domain mapped to physical memory addresses of one or more storage devices coupled with the computing platform to software or a device driver executed by a VM to enable the software or the device driver to directly access, manage or control at least a portion of the one or more storage devices. In some examples, assignment information may be received from a hypervisor/VMM managing the VM following a domain request from the hypervisor/VMM that was included in domain request 1210. Domain logic 1222 may then send domain information 1215 to the management controller through PCI interface 1203 to indicate assignment of the domain to the software or the device driver.

In some examples, apparatus 1200 may include an MCTP endpoint logic 1224 having a receive feature 1224-1. Receive feature 1224-1 of MCTP endpoint logic 1224 may be executed or supported by circuitry 1220 to receive, from the management controller, MCTP EID 1230 for the domain that is for use by the software or the device driver to respond to request messages from a management entity for a data center that includes the computing platform. The request messages included in request MCTP packets that indicate the MCTP EID that was included in MCTP EID 1230 as a destination MCTP EID for the request messages. Forward/provide feature 1224-2 of MCTP endpoint logic 1224 may be executed or supported by circuitry 1220 to provide MCTP EID 1230 to the software or device driver.

According to some examples, receive feature 1224-1 of MCTP endpoint logic 1224 may be executed or supported by circuitry 1220 to receive a request message forwarded from the management controller in one or more request MCTP packets 1240 through the PCIe interface 1203 that indicate the MCTP EID that was included in MCTP EID 1230 as a destination MCTP. For these examples, the request message may originate from the management entity and was received by the management controller via an OOB communication link coupled with the computing platform. The request message may include information directed to the software or the device driver. Forward/provide feature 1224-2 of MCTP endpoint logic 1224 may be executed or supported by circuitry 1220 to provide the request message to the software or the device driver in one or more request MCTP packets 1240.

In some examples, receive feature 1224-1 of MCTP endpoint logic 1224 may be executed or supported by circuitry 1220 to receive a response message from the software or the device driver that was generated responsive to the information included in the request message. The response message may be included in one or more response MCTP packets 1250 that indicate the assigned MCTP EID is a source MCTP endpoint for the response message. Forward/provide feature 1224-2 of MCTP endpoint logic 1224 may be executed or supported by circuitry 1220 to forward the response MCTP packet(s) 1250 that indicate the assigned MCTP EID is the source MCTP endpoint to the management controller through PCIe interface 1203 for the management controller to send the response message to the management entity via the OOB communication link.

Various components of apparatus 1200 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 13 illustrates an example logic flow 1300. Logic flow 1300 may be representative of some or all of the operations executed by one or more logic, features, or devices described herein, such as apparatus 1500. More particularly, logic flow 1300 may be implemented by at domain logic 1222 or receive feature 1224-1 and forward/provide feature 1224-2 of MCTP endpoint logic 1224.

According to some examples, logic flow 1300 at block 1302 may receive assignment information for assignment of a domain mapped to physical memory addresses of one or more storage devices coupled with the computing platform to software or a device driver executed by a VM to enable the software or the device driver to directly access, manage or control at least a portion of the one or more storage devices. For these examples, domain logic 1222 may receive the assignment information.

In some examples, logic flow 1300 at block 1304 may send information to a management controller for the computing platform to indicate assignment of the domain to the software or the device driver. For these examples, forward/provide feature 1224-2 may the information to the management controller.

According to some examples, logic flow 1300 at block 1306 may receive, from the management controller, an MCTP EID for the domain that is for use by the software or the device driver to respond to request messages from a management entity for a data center that includes the computing platform, the request messages included in MCTP packets that indicate the MCTP EID as a destination MCTP EID for the request messages. For these examples, receive feature 1224-1 may receive the MCTP EID.

FIG. 14 illustrates an example storage medium 1400. In some examples, storage medium 1400 may be an article of manufacture. Storage medium 1400 may include any non-transitory computer readable medium or machine readable medium, such as an optical, magnetic or semiconductor storage. Storage medium 1400 may store various types of computer executable instructions, such as instructions to implement logic flow 1300. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 15:
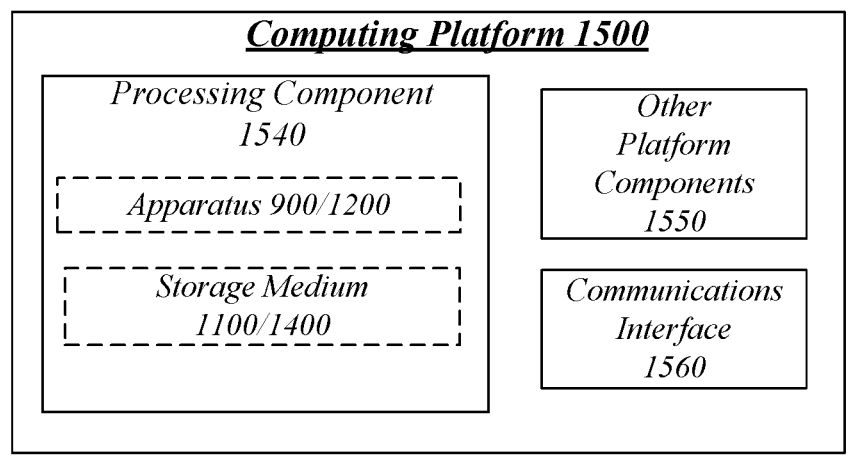
FIG. 15 illustrates an example computing platform.

FIG. 15 illustrates an example computing platform 1500. In some examples, as shown in FIG. 15, computing platform 1500 may include a processing components 1540, other platform components 1550 or a communications interface 1560.

According to some examples, processing components 1540 may execute or implement processing operations or logic for apparatus 900/1200 and/or storage medium 1100/1400. Processing components 1540 may include various hardware elements, software elements, or a combination of both. Examples of hardware elements may include devices, logic devices, components, processors, microprocessors, management controllers, companion dice, circuits, processor circuits, circuit elements (e.g., transistors, resistors, capacitors, inductors, and so forth), integrated circuits, ASICs, programmable logic devices (PLDs), digital signal processors (DSPs), FPGAs, memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1550 may include common computing elements, memory units, chipsets, controllers, peripherals, interfaces, oscillators, timing devices, video cards, audio cards, multimedia input/output (I/O) components (e.g., digital displays), power supplies, and so forth. Examples of memory units or memory devices may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1560 may include logic and/or features to support a communication interface. For these examples, communications interface 1560 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification or the I3C specification. Network communications may occur via use of communication protocols or standards such those described in one or more Ethernet standards promulgated by the Institute of Electrical and Electronics Engineers (IEEE). For example, one such Ethernet standard promulgated by IEEE may include, but is not limited to, IEEE 802.3-2018, Carrier sense Multiple access with Collision Detection (CSMA/CD) Access Method and Physical Layer Specifications, Published in August 2018 (hereinafter "IEEE 802.3 specification"). Network communication may also occur according to one or more OpenFlow specifications such as the OpenFlow Hardware Abstraction API Specification. Network communications may also occur according to one or more Infiniband Architecture specifications.

Computing platform 1500 may be implemented in a server or client computing device. Accordingly, functions and/or specific configurations of computing platform 1500 described herein, may be included or omitted in various embodiments of computing platform 1500, as suitably desired for a server or client computing device.

The components and features of computing platform 1500 may be implemented using any combination of discrete circuitry, ASICs, logic gates and/or single chip architectures. Further, the features of computing platform 1500 may be implemented using microcontrollers, FPGAs and/or microprocessors or any combination of the foregoing where suitably appropriate. It is noted that hardware, firmware and/or software elements may be collectively or individually referred to herein as "logic" or "circuit."

It should be appreciated that the exemplary computing platform 1500 shown in the block diagram of FIG. 15 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" and may be similar to IP blocks. IP cores may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

The follow examples pertain to additional examples of technologies disclosed herein.

Example 1

An example apparatus may include an interface for an OOB communication link coupled with a computing platform. The apparatus may also include circuitry. The circuitry may receive domain information for a domain for use by software or a device driver executed by a VM. The domain information may indicate that the domain is mapped to physical memory addresses of one or more storage devices coupled with the computing platform via which the software or the device driver is able to directly access, manage or control at least a portion of the one or more storage devices. The circuitry may also assign an MCTP EID to the domain. The circuitry may also receive a request message from a management entity for a data center that includes the computing platform, the request message to be received through the interface coupled with the OOB communication link and includes information directed to the software or the device driver. The circuitry may also forward the request message in one or more MCTP packets that indicate the assigned MCTP EID is a destination MCTP for the request message.

Example 2

The apparatus of example 1 may also include the circuitry to receive a response message from the software or the device driver generated responsive to the information included in the request message directed to the software or the device driver, the response message included in one or more MCTP packets that indicate the assigned MCTP EID is a source MCTP for the response message. The circuitry may also forward the response message to the management entity through the interface coupled with the OOB communication link.

Example 3

The apparatus of example 1, the information included in the request message directed to the software or the device driver may include management information to cause the software or the device driver to create a virtual RAID using the physical memory addresses of the one or more storage devices mapped to the domain, cause the software or the device driver to rebuild a virtual RAID that was created using the physical memory addresses of the one or more storage devices mapped to the domain, cause the software or the device driver to monitor a RAID state that was created using the physical memory addresses of the one or more storage devices mapped to the domain, cause the software or the device driver to monitor a health state of the one or more storage devices, or cause the software or the device driver to update storage drive firmware for the one or more storage devices.

Example 4

The apparatus of example 1, the circuitry may receive the domain information from circuitry of a processor for the computing platform, the circuitry of the processor to receive assignment information from a VMM that manages the VM, the assignment information to cause the circuitry of the processor to block access to the physical addresses mapped to the domain by other VMs managed by the VMM.

Example 5

The apparatus of example 1, the one or more storage devices may include one or more SSDs.

Example 6

The apparatus of example 5, the domain may be associated with the software or the device driver using a PCIe function to access, manage or control at least a portion of the one or more SSDs using NVMe communication protocols.

Example 7

The apparatus of example 1 may be a baseboard management controller.

Example 8

An example method may include receiving, at a management controller for a computing platform, domain information for a domain for use by software or a device driver executed by a VM. The domain information may indicate that the domain is mapped to physical memory addresses of one or more storage devices coupled with the computing platform via which the software or the device driver is able to directly access, manage or control at least a portion of the one or more storage devices. The method may also include assigning an MCTP EID to the domain. The method may also include receiving a request message from a management entity for a data center that includes the computing platform, the request message received via an OOB communication link and including information directed to the software or the device driver. The method may also include forwarding the request message in one or more MCTP packets that indicate the assigned MCTP EID is a destination MCTP for the request message.

Example 9

The method of example 8 may also include receiving a response message from the software or the device driver that was generated responsive to the information included in the request message directed to the software or the device driver. The response message may be included in one or more MCTP packets that indicate the assigned MCTP EID is a source MCTP for the response message. The method may also include forwarding the response message to the management entity via the OOB communication link.

Example 10

The method of example 8, information included in the request message directed to the software or the device driver may include management information that includes causing the software or the device driver to create a virtual RAID using the physical memory addresses of the one or more storage devices mapped to the domain, causing the software or the device driver to rebuild a virtual RAID that was created using the physical memory addresses of the one or more storage devices mapped to the domain, causing the software or the device driver to monitor a RAID state that was created using the physical memory addresses of the one or more storage devices mapped to the domain, causing the software or the device driver to monitor a health state of the one or more storage devices, or causing the software or the device driver to update storage drive firmware for the one or more storage devices.

Example 11

The method of example 8 may also include receiving the domain information from circuitry of a processor for the computing platform. The circuitry of the processor may receive assignment information from a VMM that manages the VM to indicate assignment of the domain to the VM. The assignment information may cause the circuitry of the processor to block access to the physical addresses mapped to the domain by other VMs managed by the VMM.

Example 12

The method of example 8, the one or more storage devices may include one or more SSDs.

Example 13

The method of example 12, the domain may be associated with the software or the device driver using a PCIe function to access, manage or control at least a portion of the one or more SSDs using NVMe communication protocols.

Example 14

The method of example 8, the management controller may be a baseboard management controller.

Example 15

An example at least one machine readable medium may include a plurality of instructions that in response to being executed by a system may cause the system to carry out a method according to any one of examples 8 to 14.

Example 16

An example apparatus may include means for performing the methods of any one of examples 8 to 14.

Example 17

An example at least one machine readable medium may include a plurality of instructions that in response to being executed by a system at a management controller for a computing platform, cause the system to receive domain information for a domain for use by software or a device driver executed by a VM. The domain information may indicate that the domain is mapped to physical memory addresses of one or more storage devices coupled with the computing platform via which the software or the device driver is able to directly access, manage or control at least a portion of the one or more storage devices. The instructions may also cause the system to assign an MCTP EID to the domain. The instructions may also cause the system to receive a request message from a management entity for a data center that includes the computing platform. The request message may be received via an OOB communication link and includes information directed to the software or the device driver. The instructions may also cause the system to forward the request message in one or more MCTP packets that indicate the assigned MCTP EID is a destination MCTP for the request message.

Example 18

The at least one machine readable medium of example 17, the instructions may also cause the system to receive a response message from the software or the device driver that was generated responsive to the information included in the request message directed to the software or the device driver. The response message may be included in one or more MCTP packets that indicate the assigned MCTP EID is a source MCTP for the response message. The instructions may also cause the system to forward the response message to the management entity via the OOB communication link.

Example 19

The at least one machine readable medium of example 17, the information included in the request message directed to the software or the device driver may include management information to cause the software or the device driver to create a virtual RAID using the physical memory addresses of the one or more storage devices mapped to the domain, cause the software or the device driver to rebuild a virtual RAID that was created using the physical memory addresses of the one or more storage devices mapped to the domain, cause the software or the device driver to monitor a RAID state that was created using the physical memory addresses of the one or more storage devices mapped to the domain, cause the software or the device driver to monitor a health state of the one or more storage devices, or cause the software or the device driver to update storage drive firmware for the one or more storage devices.

Example 20

The at least one machine readable medium of example 17, the instructions may further cause the system to receive the domain information from circuitry of a processor for the computing platform. The circuitry of the processor may receive assignment information from a VMM that manages the VM to indicate assignment of the domain to the VM. The assignment information may cause the circuitry of the processor to block access to the physical addresses mapped to the domain by other VMs managed by the VMM.

Example 21

The at least one machine readable medium of example 17, the one or more storage devices may include one or more SSDs.

Example 22

The at least one machine readable medium of example 21, the domain may be associated with the software or the device driver using a PCIe function to access, manage or control at least a portion of the one or more SSDs using NVMe communication protocols.

Example 23

The at least one machine readable medium of example 17, the management controller may be a baseboard management controller.

Example 24

An example apparatus may include an interface for a PCIe communication link coupled with a management controller for a computing platform. The apparatus may also include circuitry of a processor for the computing platform. The circuitry may receive assignment information for assignment of a domain mapped to physical memory addresses of one or more storage devices coupled with the computing platform to software or a device driver executed by a VM to enable the software or the device driver to directly access, manage or control at least a portion of the one or more storage devices. The circuitry may also send information to the management controller through the interface to indicate assignment of the domain to the software or the device driver. The circuitry may also receive, from the management controller, an MCTP EID for the domain that is for use by the software or the device driver to respond to request messages from a management entity for a data center that includes the computing platform. The request messages may be included in MCTP packets that indicate the MCTP EID as a destination MCTP EID for the request messages.

Example 25

The apparatus of example 24, the circuitry may also receive a request message forwarded from the management controller in one or more MCTP packets via the PCIe communication link that indicate the MCTP EID as a destination MCTP. The request message may originate from the management entity and received by the management controller via an OOB communication link coupled with the computing platform. The request message may include information directed to the software or the device driver. The circuitry may also provide the request message to the software or the device driver.

Example 26

The apparatus of example 25 may also include the circuitry to receive a response message from the software or the device driver that was generated responsive to the information included in the request message. The response message may be included in one or more MCTP packets that indicate the assigned MCTP EID is a source MCTP for the response message. The circuitry may also forward the one or more MCTP packets that indicate the assigned MCTP EID is the source MCTP to the management controller through the interface for the management controller to send the response message to the management entity via the OOB communication link.

Example 27

The apparatus of example 26, information directed to the software or the device driver may include management information that includes causing the software or the device driver to create a virtual RAID using the physical memory addresses of the one or more storage devices mapped to the domain, causing the software or the device driver to rebuild a virtual RAID that was created using the physical memory addresses of the one or more storage devices mapped to the domain, causing the software or the device driver to monitoring a RAID state that was created using the physical memory addresses of the one or more storage devices mapped to the domain, causing the software or the device driver to monitor a health state of the one or more storage devices, or causing the software or the device driver to update storage drive firmware for the one or more storage devices.

Example 28

The apparatus of example 24, the circuitry may receive the assignment information from a VM that manages the VM. The assignment information may cause the circuitry to block access to the physical memory addresses mapped to the domain by other VMs managed by the VMM.

Example 29

The apparatus of example 24, the one or more storage devices may include one or more SSDs.

Example 30

The apparatus of example 29, the domain may be associated with the software or the device driver using a PCIe function to access, manage or control at least a portion of the one or more SSDs using NVMe communication protocols.

Example 31

The apparatus of example 24, the management controller may be a baseboard management controller.

Example 32

An example method may include receiving, by circuitry of a processor for a computing platform, assignment information for assignment of a domain mapped to physical memory addresses of one or more storage devices coupled with the computing platform to software or a device driver executed by a virtual machine to enable the software or the device driver to directly access, manage or control at least a portion of the one or more storage devices. The method may also include sending information to a management controller for the computing platform to indicate assignment of the domain to the software or the device driver. The method may also include receiving, from the management controller, an MCTP EID for the domain that is for use by the software or the device driver to respond to request messages from a management entity for a data center that includes the computing platform, the request messages included in MCTP packets that indicate the MCTP EID as a destination MCTP EID for the request messages.

Example 33

The method of example 32 may include receiving a request message forwarded from the management controller in one or more MCTP packets that indicate the MCTP EID as a destination MCTP. The request message may originate from the management entity and received by the management controller via an OOB communication link coupled with the computing platform. The request message may include information directed to the software or the device driver. The method may also include providing the request message to the software or the device driver.

Example 34

The method of example 33 may also include receiving a response message from the software or the device driver that was generated responsive to the information included in the request message. The response message may be included in one or more MCTP packets that indicate the assigned MCTP EID is a source MCTP for the response message. The method may also include forwarding the one or more MCTP packets that indicate the assigned MCTP EID is the source MCTP to the management controller for the management controller to send the response message to the management entity via the OOB communication link.

Example 35

The method of example 34, information directed to the software or the device driver may include management information that includes causing the software or the device driver to create a virtual RAID using the physical memory addresses of the one or more storage devices mapped to the domain, causing the software or the device driver to rebuild a virtual RAID that was created using the physical memory addresses of the one or more storage devices mapped to the domain, causing the software or the device driver to monitoring a RAID state that was created using the physical memory addresses of the one or more storage devices mapped to the domain, causing the software or the device driver to monitor a health state of the one or more storage devices, or causing the software or the device driver to update storage drive firmware for the one or more storage devices.

Example 36

The method of example 32 may include receiving the assignment information from a VM that manages the VM. The assignment information may cause circuitry of the processor for the computing platform to block access to the physical addresses mapped to the domain by other VMs managed by the VMM.

Example 37

The method of example 32, the one or more storage devices may include one or more SSDs.

Example 38

The method of example 37, the domain may be associated with the software or the device driver using a PCIe function to access, manage or control at least a portion of the one or more SSDs using NVMe communication protocols.

Example 39

The method of example 32, the management controller may be a baseboard management controller.

Example 40

An example at least one machine readable medium may include a plurality of instructions that in response to being executed by a system may cause the system to carry out a method according to any one of examples 32 to 39.

Example 41

An example apparatus may include means for performing of any one of examples 32 to 39.

Example 42

An example at least one machine readable medium may include a plurality of instructions that in response to being executed by a system, cause the system to receive assignment information for assignment of a domain mapped to physical memory addresses of one or more storage devices coupled with a computing platform to software or a device driver executed by a virtual machine to enable the software or the device driver to directly access, manage or control at least a portion of the one or more storage devices. The instructions may also cause the system to send information to a management controller for the computing platform to indicate assignment of the domain to the software or the device driver. The instructions may also cause the system to receive, from the management controller, an MCTP EID for the domain that is for use by the software or the device driver to respond to request messages from a management entity for a data center that includes the computing platform. The request messages may be included in MCTP packets that indicate the MCTP EID as a destination MCTP EID for the request messages.

Example 43

The at least one machine readable medium of example 42, the instructions may cause the system to receive a request message forwarded from the management controller in one or more MCTP packets that indicate the MCTP EID as a destination MCTP. The request message may originate from the management entity and received by the management controller via an OOB communication link coupled with the computing platform. The request message may include information directed to the software or the device driver. The instructions may also cause the system to provide the request message to the software or the device driver.

Example 44

The at least one machine readable medium of example 42, the instructions may also cause the system to receive a response message from the software or the device driver that was generated responsive to the information included in the request message. The response message may be included in one or more MCTP packets that indicate the assigned MCTP EID is a source MCTP for the response message. The instructions may also cause the system to forward the one or more MCTP packets that indicate the assigned MCTP EID is the source MCTP to the management controller for the management controller to send the response message to the management entity via the OOB communication link.

Example 45

The at least one machine readable medium of example 42, information directed to the software or the device driver may include management information that includes causing the software or the device driver to create a virtual RAID using the physical memory addresses of the one or more storage devices mapped to the domain, causing the software or the device driver to rebuild a virtual RAID that was created using the physical memory addresses of the one or more storage devices mapped to the domain, causing the software or the device driver to monitoring a RAID state that was created using the physical memory addresses of the one or more storage devices mapped to the domain, causing the software or the device driver to monitor a health state of the one or more storage devices, or causing the software or the device driver to update storage drive firmware for the one or more storage devices.

Example 46

The at least one machine readable medium of example 42, the instructions may also cause the system to receive the assignment information from a VM that manages the VM, the assignment information to cause circuitry of a processor for the computing platform to block access to the physical addresses mapped to the domain by other VMs managed by the VMM.

Example 47

The at least one machine readable medium of example 42, the one or more storage devices may include one or more SSDs.

Example 48

The at least one machine readable medium of example 47, the domain may be associated with the software or the device driver using a PCIe function to access, manage or control at least a portion of the one or more SSDs using NVMe communication protocols.

Example 49

The at least one machine readable medium of example 42, the management controller may be a baseboard management controller.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   an interface for an out-of-band (OOB) communication link coupled with a computing platform; and
   circuitry to:
     receive domain information for a domain for use by software or a device driver executed by a virtual machine (VM), the domain information indicating that the domain is mapped to physical memory addresses of one or more storage devices coupled with the computing platform via which the software or the device driver is able to directly access, manage or control at least a portion of the one or more storage devices;
     assign a multiple component transport protocol (MCTP) endpoint identifier (EID) to the domain;
     receive a request message from a management entity for a data center that includes the computing platform, the request message to be received through the interface coupled with the OOB communication link and includes information directed to the software or the device driver; and
     forward the request message in one or more MCTP packets that indicate the assigned MCTP EID is a destination MCTP endpoint for the request message.

2. The apparatus of claim 1, further comprising the circuitry to:
   receive a response message from the software or the device driver generated responsive to the information included in the request message directed to the software or the device driver, the response message included in one or more MCTP packets that indicate the assigned MCTP EID is a source MCTP endpoint for the response message; and
   forward the response message to the management entity through the interface coupled with the OOB communication link.

3. The apparatus of claim 1, the information included in the request message directed to the software or the device driver comprises management information to cause the software or the device driver to create a virtual redundant array of independent disks (RAID) using the physical memory addresses of the one or more storage devices mapped to the domain, cause the software or the device driver to rebuild a virtual RAID that was created using the physical memory addresses of the one or more storage devices mapped to the domain, cause the software or the device driver to monitor a RAID state that was created using the physical memory addresses of the one or more storage devices mapped to the domain, cause the software or the device driver to monitor a health state of the one or more storage devices, or cause the software or the device driver to update storage drive firmware for the one or more storage devices.

4. The apparatus of claim 1, comprising the circuitry to receive the domain information from circuitry of a processor for the computing platform, the circuitry of the processor to receive assignment information from a virtual machine monitor (VMM) that manages the VM to indicate assignment of the domain to the VM, the assignment information to cause the circuitry of the processor to block access to the physical addresses mapped to the domain by other VMs managed by the VMM.

5. The apparatus of claim 1, the one or more storage devices comprise one or more solid state drives (SSDs).

6. The apparatus of claim 5, comprising the domain is associated with the software or the device driver using a peripheral component interface express (PCIe) function to access, manage or control at least a portion of the one or more SSDs using non-volatile memory express (NVMe) communication protocols.

7. The apparatus of claim 1, comprises a baseboard management controller.

8. A method comprising:
receiving, at a management controller for a computing platform, domain information for a domain for use by software or a device driver executed by a virtual machine (VM), the domain information indicating that the domain is mapped to physical memory addresses of one or more storage devices coupled with the computing platform via which the software or the device driver is able to directly access, manage or control at least a portion of the one or more storage devices;
assigning a multiple component transport protocol (MCTP) endpoint identifier (EID) to the domain;
receiving a request message from a management entity for a data center that includes the computing platform, the request message received via an out-of-band (OOB) communication link and including information directed to the software or the device driver; and
forwarding the request message in one or more MCTP packets that indicate the assigned MCTP EID is a destination MCTP endpoint for the request message.

9. The method of claim 8, further comprising:
receiving a response message from the software or the device driver that was generated responsive to the information included in the request message directed to the software or the device driver, the response message included in one or more MCTP packets that indicate the assigned MCTP EID is a source MCTP endpoint for the response message; and
forwarding the response message to the management entity via the OOB communication link.

10. The method of claim 8, information included in the request message directed to the software or the device driver comprises management information that includes causing the software or the device driver to create a virtual redundant array of independent disks (RAID) using the physical memory addresses of the one or more storage devices mapped to the domain, causing the software or the device driver to rebuild a virtual RAID that was created using the physical memory addresses of the one or more storage devices mapped to the domain, causing the software or the device driver to monitor a RAID state that was created using the physical memory addresses of the one or more storage devices mapped to the domain, causing the software or the device driver to monitor a health state of the one or more storage devices, or causing the software or the device driver to update storage drive firmware for the one or more storage devices.

11. The method of claim 8, the one or more storage devices comprise one or more solid state drives (SSDs) and the domain is associated with the software or the device driver using a peripheral component interface express (PCIe) function to access, manage or control at least a portion of the one or more SSDs using non-volatile memory express (NVMe) communication protocols.

12. At least one machine readable medium comprising a plurality of instructions that in response to being executed by a system at a management controller for a computing platform, cause the system to:
receive domain information for a domain for use by software or a device driver executed by a virtual machine (VM), the domain information indicating that the domain is mapped to physical memory addresses of one or more storage devices coupled with the computing platform via which the software or the device driver is able to directly access, manage or control at least a portion of the one or more storage devices;
assign a multiple component transport protocol (MCTP) endpoint identifier (EID) to the domain;
receive a request message from a management entity for a data center that includes the computing platform, the request message received via an out-of-band (OOB) communication link and includes information directed to the software or the device driver; and
forward the request message in one or more MCTP packets that indicate the assigned MCTP EID is a destination MCTP endpoint for the request message.

13. The at least one machine readable medium of claim 12, further comprising the instructions to cause the system to:
receive a response message from the software or the device driver that was generated responsive to the information included in the request message directed to the software or the device driver, the response message included in one or more MCTP packets that indicate the assigned MCTP EID is a source MCTP endpoint for the response message; and
forward the response message to the management entity via the OOB communication link.

14. The at least one machine readable medium of claim 12, the one or more storage devices comprise one or more solid state drives (SSDs) and the domain is associated with the software or the device driver using a peripheral component interface express (PCIe) function to access, manage or control at least a portion of the one or more SSDs using non-volatile memory express (NVMe) communication protocols.

15. An apparatus comprising:
an interface for a peripheral component interface express (PCIe) communication link coupled with a management controller for a computing platform; and
circuitry of a processor for the computing platform, the circuitry to:
receive assignment information for assignment of a domain mapped to physical memory addresses of one or more storage devices coupled with the computing platform to software or a device driver executed by a virtual machine (VM) to enable the software or the device driver to directly access, manage or control at least a portion of the one or more storage devices;
send information to the management controller through the interface to indicate assignment of the domain to the software or the device driver; and
receive, from the management controller, a multiple component transport protocol (MCTP) endpoint identifier (EID) for the domain that is for use by the software or the device driver to respond to request messages from a management entity for a data center that includes the computing platform, the request messages included in MCTP packets that indicate the MCTP EID as a destination MCTP EID for the request messages.

16. The apparatus of claim 15, further comprising the circuitry to:
receive a request message forwarded from the management controller in one or more MCTP packets via the PCIe communication link that indicate the MCTP EID as a destination MCTP, the request message originating from the management entity and received by the management controller via an out-of-band (OOB) communication link coupled with the computing platform, the request message including information directed to the software or the device driver; and
provide the request message to the software or the device driver.

17. The apparatus of claim 16, further comprising the circuitry to:
receive a response message from the software or the device driver that was generated responsive to the information included in the request message, the response message included in one or more MCTP packets that indicate the assigned MCTP EID is a source MCTP endpoint for the response message; and
forward the one or more MCTP packets that indicate the assigned MCTP EID is the source MCTP endpoint to the management controller through the interface for the management controller to send the response message to the management entity via the OOB communication link.

18. The apparatus of claim 17, information directed to the software or the device driver comprises management information that includes causing the software or the device driver to create a virtual redundant array of independent disks (RAID) using the physical memory addresses of the one or more storage devices mapped to the domain, causing the software or the device driver to rebuild a virtual RAID that was created using the physical memory addresses of the one or more storage devices mapped to the domain, causing the software or the device driver to monitoring a RAID state that was created using the physical memory addresses of the one or more storage devices mapped to the domain, causing the software or the device driver to monitor a health state of the one or more storage devices, or causing the software or the device driver to update storage drive firmware for the one or more storage devices.

19. The apparatus of claim 15, comprising the circuitry to receive the assignment information from a virtual machine monitor (VMM) that manages the VM, the assignment information to cause the circuitry to block access to the physical memory addresses mapped to the domain by other VMs managed by the VMM.

20. The apparatus of claim 15, the one or more storage devices comprise one or more solid state drives (SSDs) and the domain is associated with the software or the device driver using a peripheral component interface express (PCIe) function to access, manage or control at least a portion of the one or more SSDs using non-volatile memory express (NVMe) communication protocols.

* * * * *